(12) United States Patent
Scharrer

(10) Patent No.: US 10,520,086 B2
(45) Date of Patent: Dec. 31, 2019

(54) APPARATUS AND SYSTEMS FOR PREVENTING EXTRUSION

(71) Applicant: T-Lon Products, Inc., Hartland, WI (US)

(72) Inventor: Jon Scharrer, Johnson Creek, WI (US)

(73) Assignee: T-LON PRODUCTS, INC., Hartland, WI (US)

( * ) Notice: Subject to any disclaimer, the term of this patent is extended or adjusted under 35 U.S.C. 154(b) by 22 days.

(21) Appl. No.: 15/646,877

(22) Filed: Jul. 11, 2017

(65) Prior Publication Data

US 2019/0017600 A1 Jan. 17, 2019

(51) Int. Cl.
*F16J 9/14* (2006.01)

(52) U.S. Cl.
CPC ..................... *F16J 9/14* (2013.01)

(58) Field of Classification Search
CPC ..................... F16J 9/14; F16J 9/12
See application file for complete search history.

(56) References Cited

U.S. PATENT DOCUMENTS

| | | | | |
|---|---|---|---|---|
| 2,376,148 A | * | 5/1945 | Johnston | F16J 9/08 277/473 |
| 4,027,816 A | * | 6/1977 | Slator | F16J 15/166 277/437 |
| 4,032,159 A | * | 6/1977 | Zitting | F16J 15/166 277/473 |
| 4,431,200 A | * | 2/1984 | Sugimura | F16J 9/14 277/459 |
| 4,468,041 A | * | 8/1984 | Yoshimura | F16J 15/166 277/562 |
| 4,516,785 A | | 5/1985 | Miller et al. | |
| 4,840,379 A | * | 6/1989 | Thoman, Jr. | F16J 9/14 277/468 |
| 5,088,744 A | * | 2/1992 | Oseman | F16J 15/166 277/560 |
| 5,131,666 A | | 7/1992 | Hutchens | |
| 5,143,382 A | | 9/1992 | Maringer | |
| 5,275,422 A | * | 1/1994 | Rehfeld | F16J 9/06 277/468 |
| 5,467,689 A | | 11/1995 | Carlin et al. | |
| 5,617,918 A | | 4/1997 | Cooksey et al. | |
| 5,988,649 A | | 11/1999 | Van Ryper et al. | |

(Continued)

FOREIGN PATENT DOCUMENTS

EP 218049 4/1987
JP 5617658 11/2014

(Continued)

OTHER PUBLICATIONS

T-Lon "TLI" Series Piston Seal, Catalog Sheets, dated Jan. 2016, 3 pages.

(Continued)

*Primary Examiner* — Eugene G Byrd
(74) *Attorney, Agent, or Firm* — Ryan Kromholz & Manion, S.C.

(57) ABSTRACT

An anti-extrusion ring for supporting a sealing unit of a piston or rod system is disclosed. The anti-extrusion ring is split across two surfaces for ease of installation and the split is configured to effectively prevent extrusion at either split surface and eliminate nibbling of the sealing components.

5 Claims, 11 Drawing Sheets

(56) References Cited

U.S. PATENT DOCUMENTS

| | | |
|---|---|---|
| 6,173,968 B1 | 1/2001 | Nelson et al. |
| 6,302,405 B1 | 10/2001 | Edwards |
| 6,428,014 B2 * | 8/2002 | Scarlett .................. F16J 9/16 |
| | | 277/435 |
| 6,832,671 B1 | 12/2004 | Stafford |
| 7,434,849 B2 | 10/2008 | Takeuchi et al. |
| 7,717,433 B2 * | 5/2010 | Taylor .................. F16J 15/26 |
| | | 277/416 |
| 8,262,091 B2 | 9/2012 | Lewis |
| 8,474,829 B2 | 7/2013 | Otsuka et al. |
| 8,728,213 B2 | 5/2014 | Elwell et al. |
| 9,388,902 B2 | 7/2016 | Sueyoshi et al. |
| 9,995,394 B2 * | 6/2018 | Bradshaw .............. F16J 15/166 |
| 2005/0023828 A1 * | 2/2005 | Takeuchi ................. F16L 13/08 |
| | | 285/205 |
| 2007/0052181 A1 | 3/2007 | Nakamura |
| 2007/0222162 A1 | 9/2007 | Stoner |
| 2010/0320217 A1 | 12/2010 | Okawachi et al. |
| 2011/0084455 A1 | 4/2011 | Elwell et al. |
| 2015/0176361 A1 | 6/2015 | Prosser et al. |
| 2016/0032681 A1 * | 2/2016 | McGruddy ......... E21B 33/1216 |
| | | 277/336 |
| 2016/0123468 A1 | 5/2016 | Foote et al. |

FOREIGN PATENT DOCUMENTS

| | | |
|---|---|---|
| JP | 2015169326 | 9/2015 |
| WO | WO2014091930 | 6/2014 |
| WO | WO2015086050 | 6/2015 |
| WO | WO2016047369 | 3/2016 |

OTHER PUBLICATIONS

T-Lon "TL171" Series Spiral Back-Up Ring, Catalog Sheets, dated Jan. 2016, 6 pages.

UTEX Industries, Inc. Product Bulletin, J-Cut Back-Up Rings, dated Nov. 11, 2008, 2 pages.

* cited by examiner

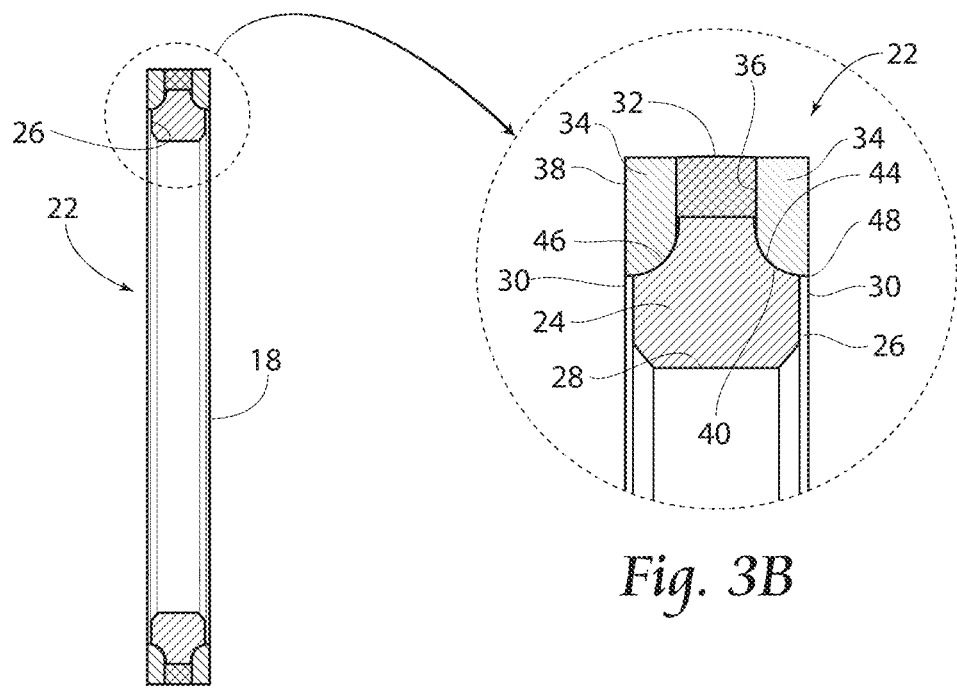
Fig. 3A
Fig. 3B
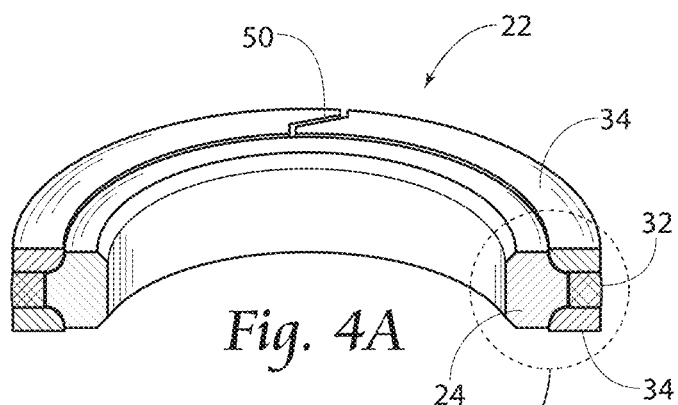
Fig. 4A
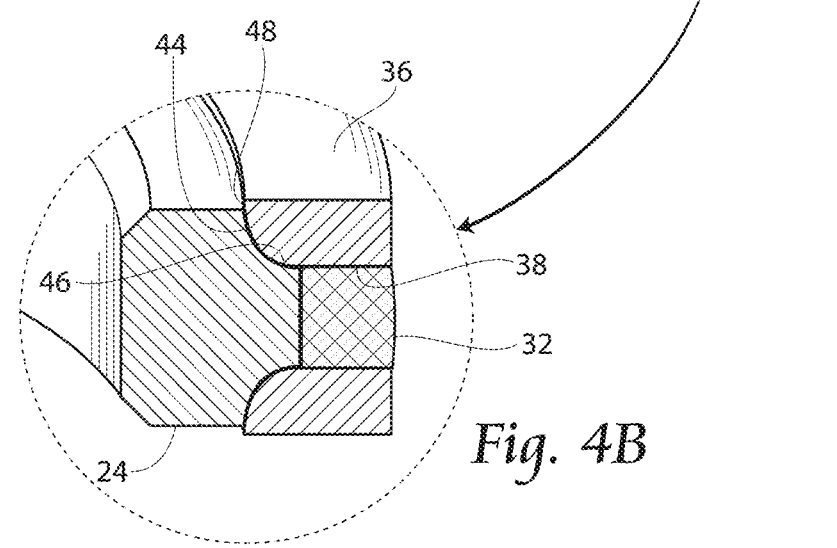
Fig. 4B

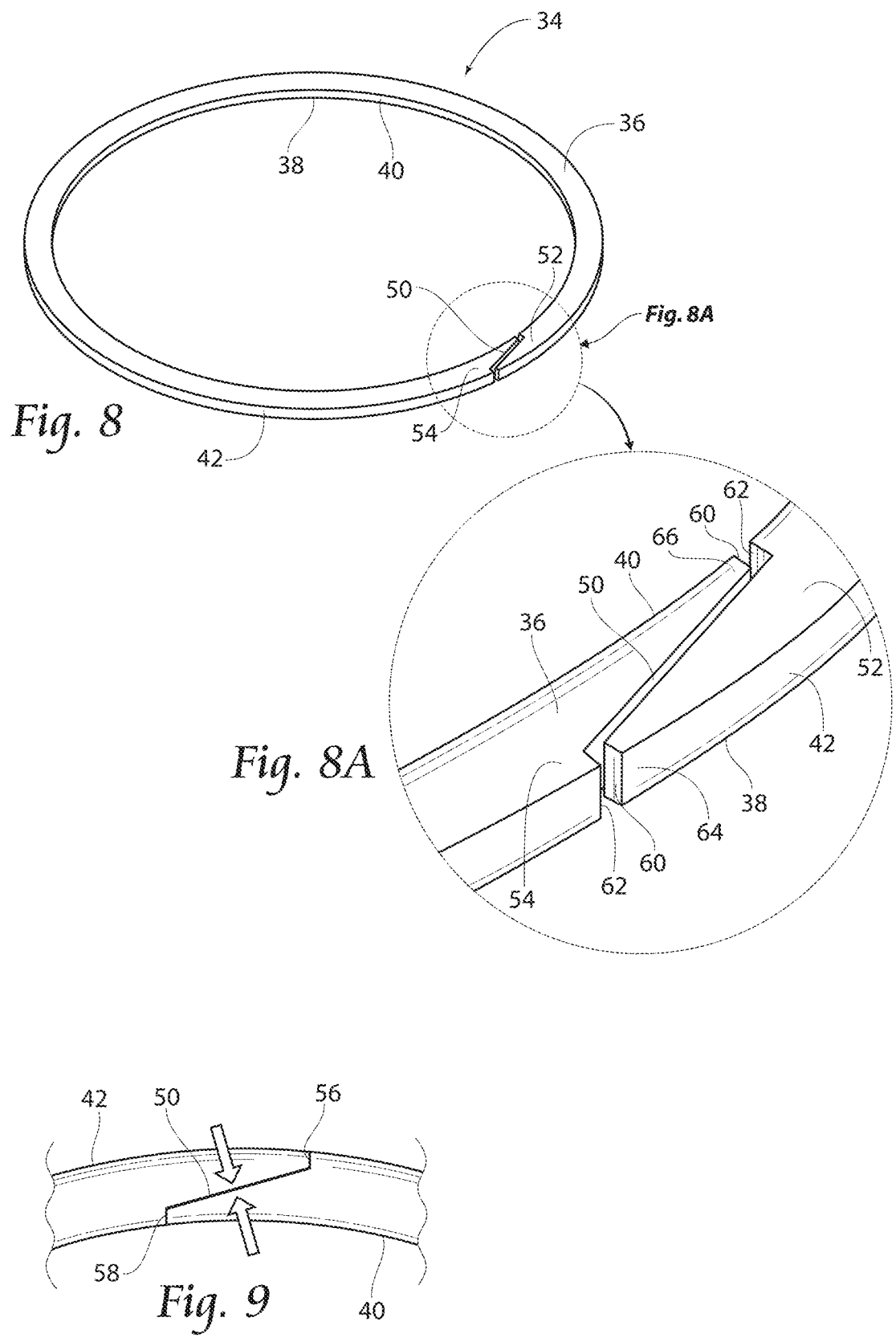

APPARATUS AND SYSTEMS FOR PREVENTING EXTRUSION

BACKGROUND OF THE INVENTION

Most hydraulic or pneumatic systems employ elastomeric and/or plastic sealing rings to prevent the flow of pressurized fluid past the system's piston member. Such sealing rings are typically held into sealing compression against the interior of the system's piston cylinder by a loader support member. The loader is seated in a radial groove around the piston such that it provides a loading force to seal any gaps between the rod surface and the surface of the interior of the cylinder.

Piston systems that are subjected to high temperatures experience thermal expansion, increasing friction between the sealing ring and the interior of the cylinder. Thermal expansion and high temperatures therefore increase the risk of seal extrusion and seal damage.

Alternately, or in addition to thermal expansion, high fluid pressures increase seal friction and risk of seal extrusion and seal damage. In either case, friction and pressure each hinder smooth axial movement and may cause the seal to extrude or roll in the gap between the piston and cylinder bore, increasing the opportunity for fluid leakage/seal failure. Thus, in high pressure and/or temperature applications, it is advantageous to provide a robust seal that prevents extrusion past the piston head and ultimately prevents damage to the sealing ring or loader.

Damage to the sealing ring or loader frequently presents itself as "nibbling", which is simply to say that fragments of the ring/loader are tugged off. This not only damages the ring/loader, which can no longer offer as effective a seal, but also the system as a whole, introducing chunks of material from the nibbled areas that contaminate the system, which can cause even further damage.

A simple and inexpensive way to offer a seal with a higher pressure rating and improved extrusion resistance is to provide rigid or semi-rigid anti-extrusion rings, or back-up rings, adjacent to one or both sides of the sealing ring. Anti-extrusion rings support sealing rings and/or loaders from extruding between the piston and the bore. Further, anti-extrusion rings themselves may present a barrier against extrusion, nibbling, and/or rolling of the loader and/or seal ring.

Installation of a continuous (unbroken) anti-extrusion ring onto a piston would require removal of the sealing ring and possibly the loader or require a split piston design, depending on the configuration of the piston system. In addition, anti-extrusion rings are generally rigid, making it difficult to s retch over the piston. Thus, for the easiest installation of anti-extrusion rings, they are commonly split across their circumference. However, once cut, anti-extrusion rings tend to separate or overlap at the split, particularly under the circumstances under which they would be most likely to be used, i.e., high pressure and/or high or low temperature situations. Such separation or overlap at the split can prevent the anti-extrusion rings from performing effectively in support of the sealing ring and/or loader and may in and of itself cause damage to the system.

SUMMARY OF THE INVENTION

The present invention is directed to an anti-extrusion ring that is split for easy installation but also effective in supporting a sealing ring and/or loader against extrusion and damage. Specifically, the invention relates to an anti-extrusion ring having a particular cut design dubbed "JZ-cut."

The JZ-cut allows for expansion of the anti-extrusion ring without releasing the anti-extrusion ring's ability to support the sealing ring. Most importantly, the JZ-cut prevents "nibbling" and damage to the sealing ring and/or loader caused by multiple pressure cycles or extreme temperatures.

BRIEF DESCRIPTION OF THE DRAWINGS

FIG. 3A is a cross-sectional view of the seal assembly situated on the piston within the piston groove taken from line 3-3 of FIG. 2;

FIG. 3B is a close-up view taken from FIG. 3A;

FIG. 4A is a cutaway perspective view of the seal of FIG. 2 showing an exemplary seal assembly;

FIG. 4B is a close-up view taken from FIG. 4A;

FIG. 8 is a perspective view of an embodiment of the anti-extrusion ring of the present invention;

FIG. 8A is a close up view of the JZ-cut taken from FIG. 8;

FIG. 9 is a top view of the JZ-cut shown in use under pressure as indicated by the arrows;

DETAILED DESCRIPTION OF THE PREFERRED EMBODIMENT

Figure 2:
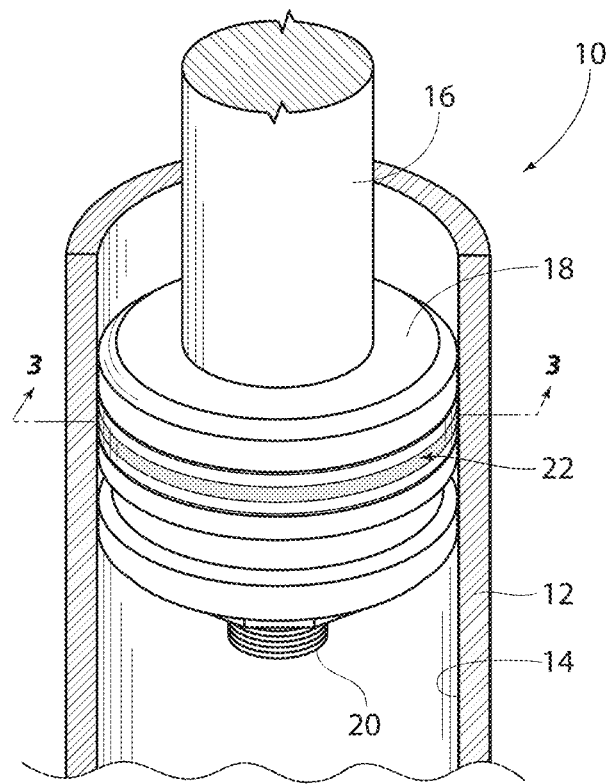
FIG. 2 is a cutaway perspective view of a piston and cylinder of FIG. 1.

As seen in FIG. 2, an exemplary piston system 10 comprises a cylinder 12 having an interior surface 14, a rod 16, a piston 18, and a threaded connection element 20. A seal assembly 22 is situated around the circumference of piston 18 in compressing engagement with interior surface 14.

FIGS. 3A and 3B illustrate an embodiment of the present invention, i.e. seal assembly 22, in place on piston 18. Specifically, seal assembly 22 includes a loading member 24 which is preferably seated within a piston groove 26 having a groove surface 28 and groove walls 30, and a sealing member 32 which loading member 24 urges into sealing contact with interior surface 14 of cylinder 12. In a preferred embodiment, seal assembly 22 further includes a pair of anti-extrusion rings 34, one on either side of sealing member 32. However, as previously indicated, a single anti-extrusion ring 34 could be employed, in which case sealing member 32 could be eliminated.

Anti-extrusion rings 34 have a top face 36 abutting sealing member 32 and extending toward groove 26 to also abut a portion of loading member 24. Anti-extrusion rings 34 further have a bottom face 38 opposite top face 36, an inner peripheral surface 40 generally facing piston 18, and an outer peripheral surface 42 facing interior surface 14 of cylinder 12.

As best seen in FIG. 4B, loading member 24 preferably has a generally T-shaped cross-section with concave radial corners 44 at the intersection of the T. Inner faces 36 of anti-extrusion rings 34 preferably have corresponding convex radial corners 46 such that inner face (convex radial) corners 46 may be closely seated against loading member (concave radial) corners 44. These corresponding radial corners 44, 46 prevent cracking or tearing at the interface of the loader and anti-extrusion ring that a sharp corner could cause. Corresponding chamfered corners could be used in place of the radial corners shown.

Figure 14:
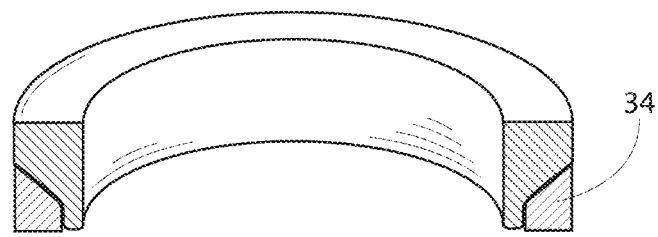
FIGS. 14-16 are illustrative embodiments of 2 piece seal assemblies having an anti-extrusion ring with a JZ-cut.
Figure 15:
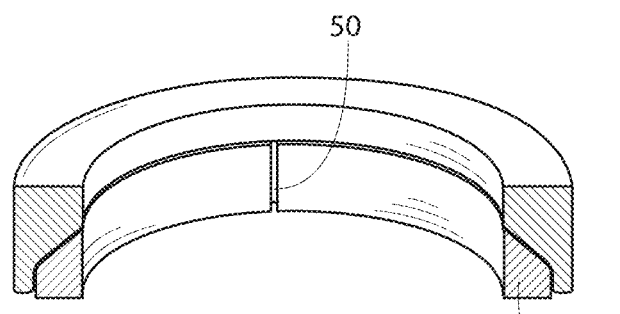
Figure 16:
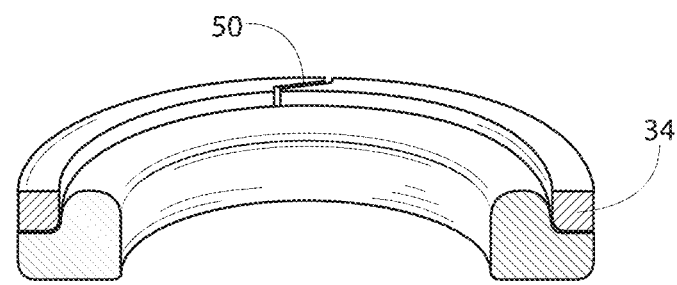
Figure 17:
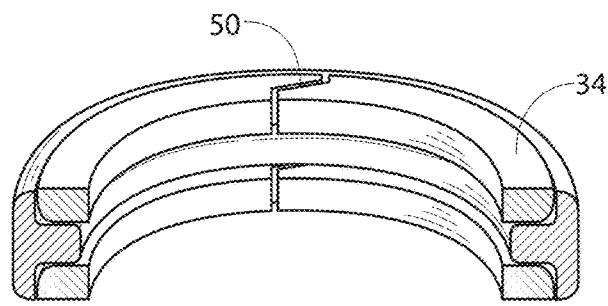
FIGS. 17-20 are illustrative embodiments of 3 piece seal assemblies having at least one anti-extrusion ring with a JZ-cut.
Figure 18:
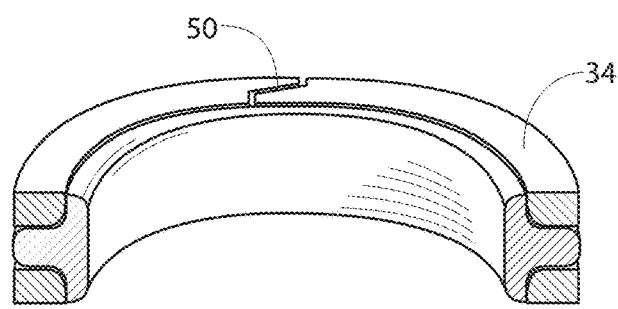
Figure 19:
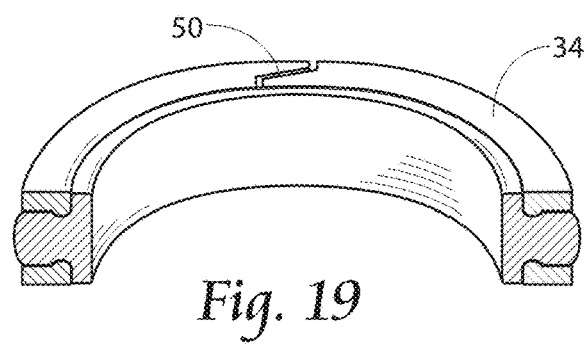
Figure 20:
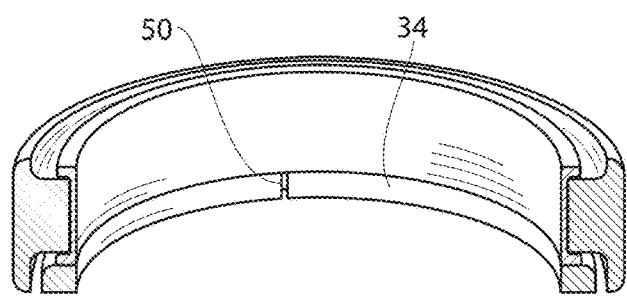
Figure 21:
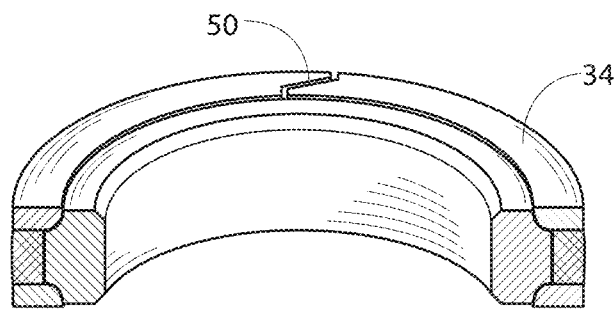
FIGS. 21-23 are illustrative embodiments of 4 piece seal assemblies having at least one anti-extrusion ring with a JZ-cut.
Figure 22:
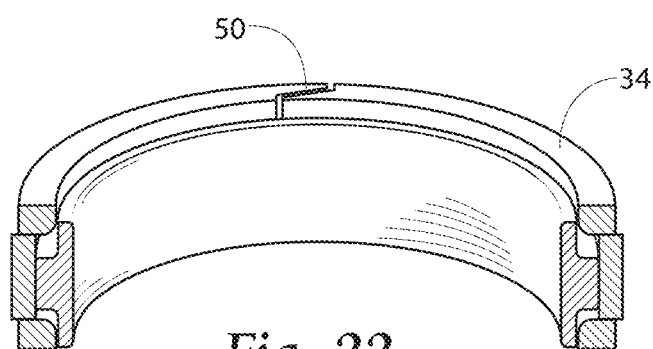
Figure 23:
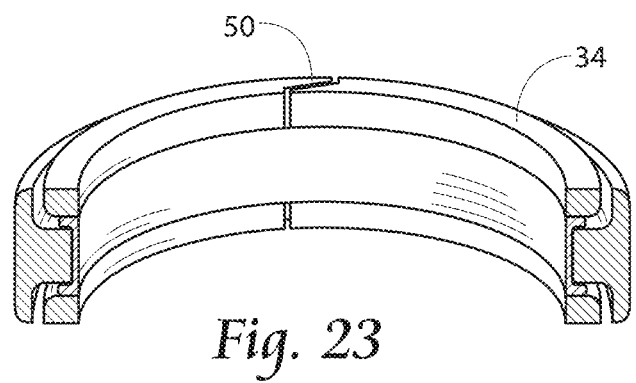
Figure 24:
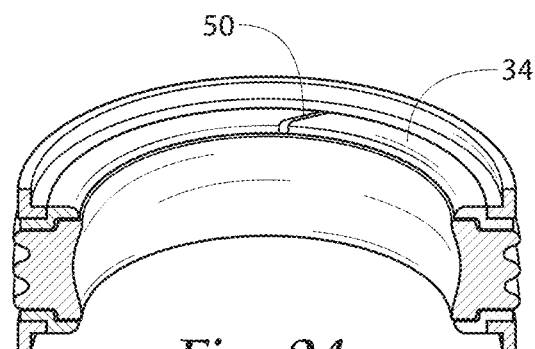
FIGS. 24-25 are illustrative embodiments of 5 piece seal assemblies having at least one anti-extrusion rings with a JZ-cut.
Figure 25:
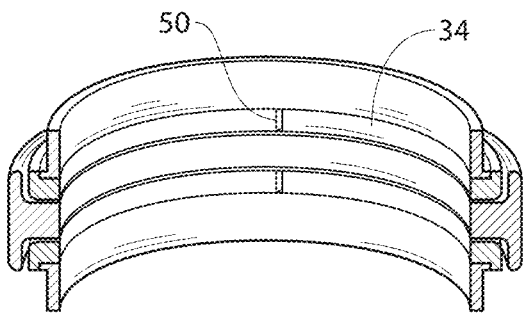
Figure 26:
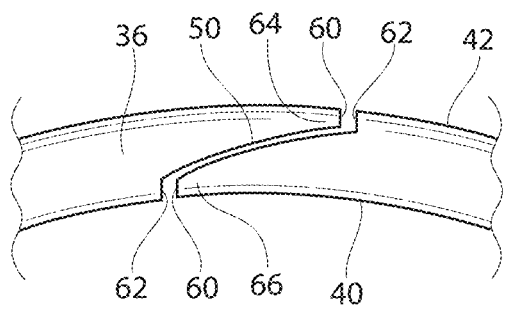
FIGS. 26-29 are illustrative embodiments of the JZ-cut having different geometries.
Figure 27:
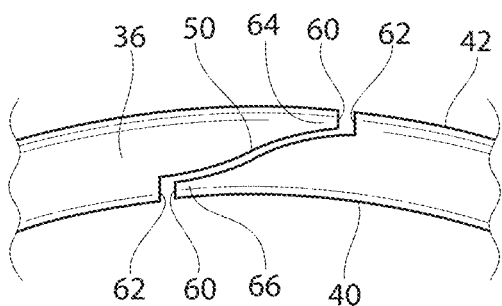

It should be noted that alternate loader member cross-sections are possible. By way of example and not limitation, FIGS. 14-16 show a more generally L-shaped loading member.

Referring now to FIGS. 8, 8A, and 9, anti-extrusion ring 34 has a cut 50 through top face 36 and bottom face 38 to allow for easy wraparound installation on seal assembly 22. Cut 50 creates a first end portion 52 and a second end portion 54. In a preferred embodiment of the present invention, as seen in FIG. 9, cut 50 includes a first radial cut 56 on outer peripheral surface 42 and a second radial cut 58 on inner peripheral surface 40 in which first radial cut 56 is offset from second radial cut 58. Cut 50 is therefore generally diagonal, as best seen in FIG. 8A.

This arrangement produces a flat 60 and an abutment 62 offset from flat 60 at the distal end 64 of first end portion 52. Likewise, a flat 60 and an abutment 62 offset from flat 60 are created at the distal end 66 of second end portion 54.

Figure 5A:
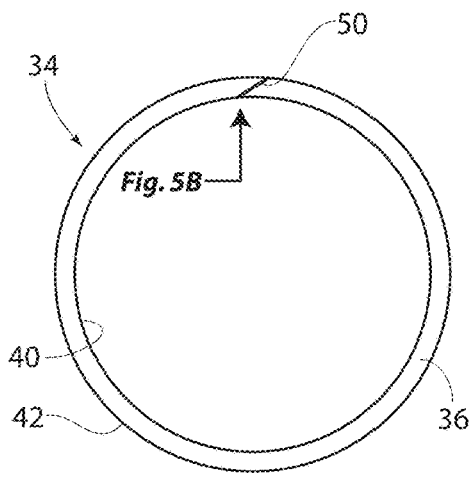
FIG. 5A is a top view of a first prior art anti-extrusion ring.
Figure 5B:
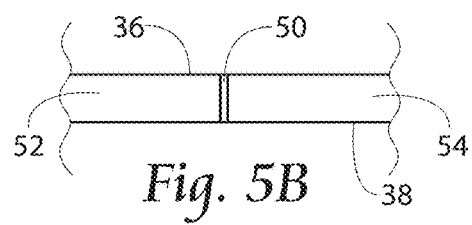
FIG. 5B is a side view of the prior art anti-extrusion ring of FIG. 5A.
Figure 5C:
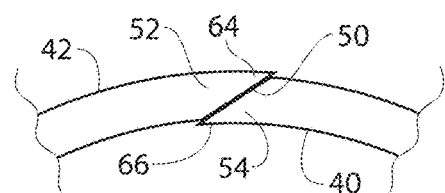
FIG. 5C is a top view of the prior art anti-extrusion ring of FIG. 5A showing separation of the first and second end portions at the location of the cut.

Turning now to FIGS. 5-7, exemplary prior art anti-extrusion rings 34 are shown with different split configurations. For example, as seen in FIGS. 5A, 5B and 5C, a prior art anti-extrusion ring has a simple cut 50, known as a "scarf cut," through its inner and outer faces 36, 38 creating first and second end portions 52, 54.

Figure 6A:
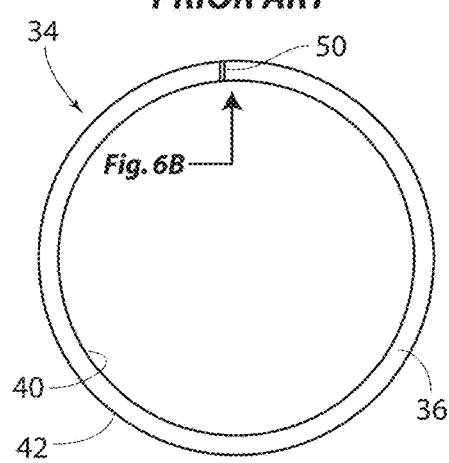
FIG. 6A is a top view of a second prior art anti-extrusion ring.
Figure 6B:
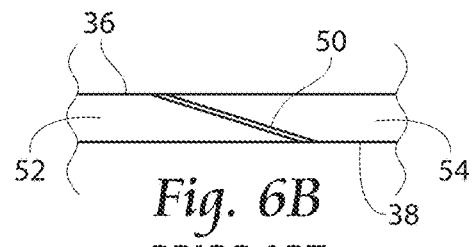
FIG. 6B is a side view of the prior art anti-extrusion ring of FIG. 6A.
Figure 6C:
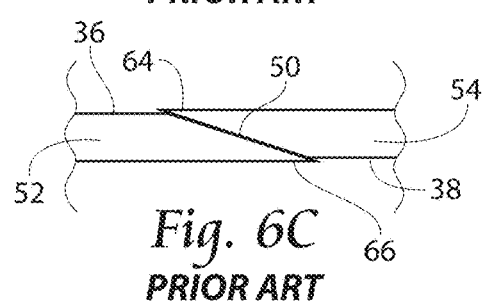
FIG. 6C is a side view of the prior art anti-extrusion ring of FIG. 6A showing separation of the first and second end portions at the location of the cut.

FIGS. 6A, 6B and 6C illustrate an anti-extrusion ring also having a scarf cut. However, in this embodiment, rather than orienting cut 50 through the inner and outer faces 36, 38, cut 50 extends from inner peripheral surface 40 through outer peripheral surface 42 of anti-extrusion ring 34.

The prior art configurations shown in FIGS. 5 and 6 thus both yield pointed end portions 52, 54. In the configuration of FIG. 5 the pointed end portions 52, 54 are oriented toward inner peripheral surface 40 and outer peripheral surface 42 respectively, while in the FIG. 6 embodiment pointed end portions 52, 54 are oriented toward top face 36 and bottom face 38 (not shown). In both cases, as seen in FIGS. 5C and 6C, when these scarf cut embodiments are placed under the pressure and temperature that defines the use of anti-extrusion rings, they tend to separate or overlap. The free ends are then able to damage loading member 24 and/or extrude between piston 18 and interior surface 14 of cylinder 12. Either situation may result in unwanted fluid extrusion or seal damage.

Figure 7A:
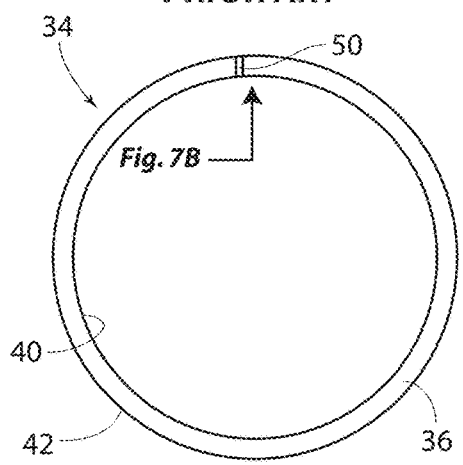
FIG. 7A is a top view of a third prior art anti-extrusion ring.
Figure 7B:
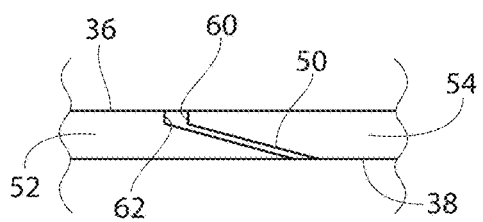
FIG. 7B is a side view of the prior art anti-extrusion ring of FIG. 7A.
Figure 7C:
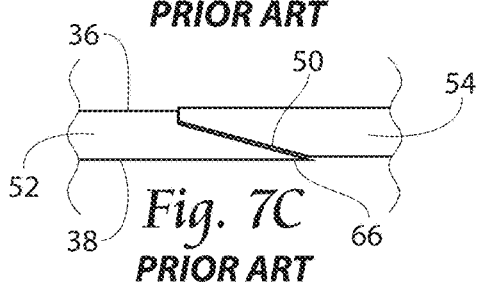
FIG. 7C is a side view of the prior art anti-extrusion ring of FIG. 7A showing separation of the first and second end portions at the location of the cut.
Figure 10:
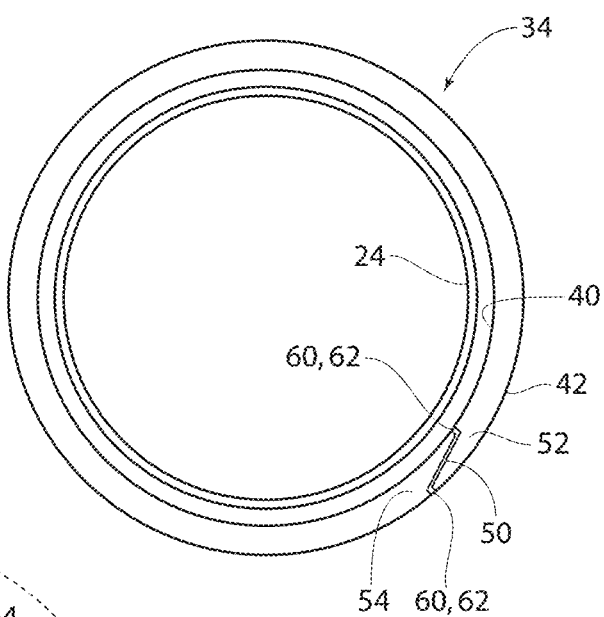
FIG. 10 is a top view of an embodiment of the anti-extrusion ring on a seal assembly.
Figure 11:
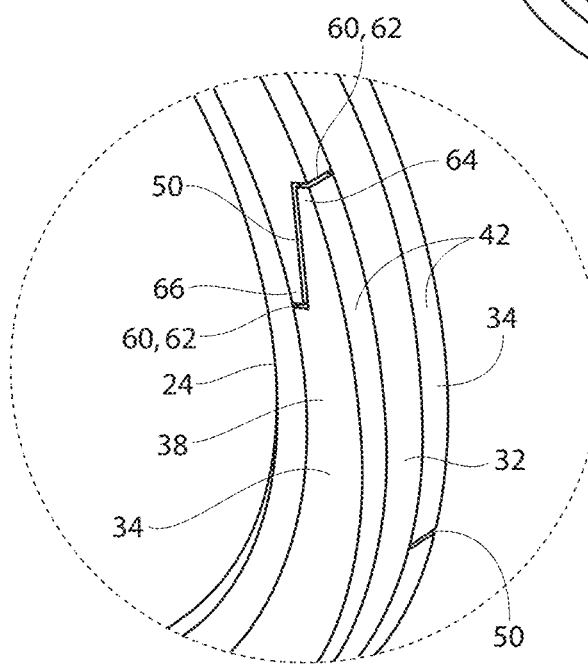
FIG. 11 is a detailed perspective view of a pair of anti-extrusion rings on a seal assembly.
Figure 12:
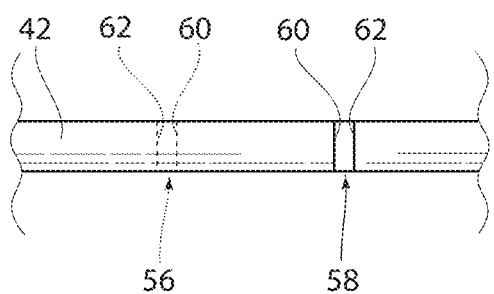
FIG. 12 is a side view of the JZ-cut of the anti-extrusion ring showing a radial cut on the outer peripheral surface and, in phantom, a radial cut on the inner peripheral surface.
Figure 13:
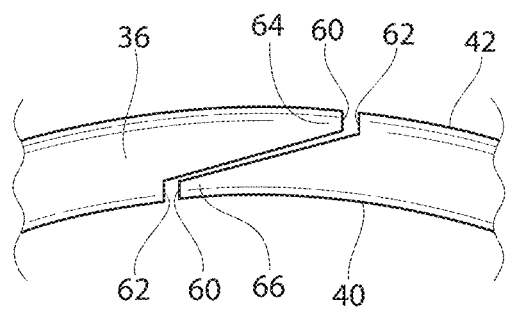
FIG. 13 is a top view of the JZ-cut of the anti-extrusion ring.

In FIGS. 7A, 7B, and 7C, an anti-extrusion ring 34 bears a cut 50 that originates with a radial cut at top face 36 and extends angularly through bottom face 38. A flat 60 is therefore created on end portion 54 and an abutment 62 on end portion 52 at top surface 36. This design is intended to prevent end overlap in high temperatures or with oversized rings/undersized bores. However, as seen in FIG. 7C, the design yields a sharp edge at the distal end of the second end portion 66. This style of cut also suffers from manufacturing difficulties.

The anti-extrusion ring 34 of the present invention therefore provides a flat/abutment arrangement 60, 62 on each out inner peripheral and outer peripheral surfaces 40, 42. As shown by the arrows in FIG. 9, this arrangement creates force on loading member 24, which in turn closes the gap of the cut, preventing extrusion and damage to loader 24 and any surrounding structures.

In a preferred embodiment of the sealing assembly 22, loading member 24 may be made of low temp buna-n which can be used in temperatures ranging from −65° F. to 275° F. Sealing member 32 can be constructed of T-LON 21™, a bronze PTFE material, or T-LON 31™, a glass/MoS2 PTFE. Anti-extrusion rings 34 are preferably made with acetal or polyamide (nylon).

In a preferred embodiment of seal assembly 22, as seen in FIGS. 10-13, a pair of anti-extrusion rings 34 are positioned on either side of sealing member 32. FIGS. 14-25 illustrate varying sizes and shapes of piston seal assemblies having a JZ-cut anti-extrusion ring. Depending on the application and conditions for use, a seal could have two to five or more pieces and numerous configurations.

Figure 28:
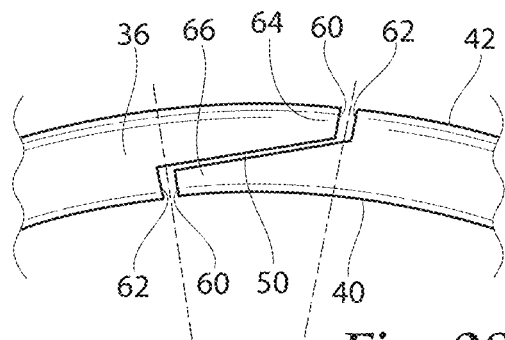
Figure 29:
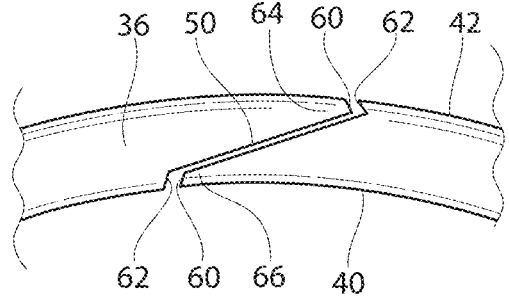

FIGS. 26-29 illustrate the different geometric configurations that a JZ-cut may have. For example, in FIGS. 26 and 27, it can be seen that cut 50 need not be straight. Likewise, as seen in FIGS. 28 and 29, flats 60 and abutments 62 could be oriented at different angles. Further, FIGS. 28 and 29 show that flats 60 and abutments 62 need not be any particular depth but can be varied according to the application, manufacturing needs, or other factors. Using current manufacturing processes and materials, flats 60 and abutments 62 have been found effective as small as 0.010 inches, but different materials and/or manufacturing processes may have different minimum or maximum depths.

Figure 30:
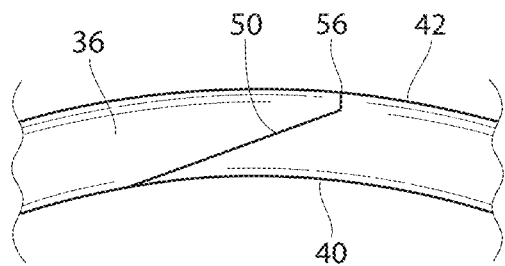
FIG. 30 is a top view of an alternate embodiment which is a variant of the JZ-cut.
Figure 31:
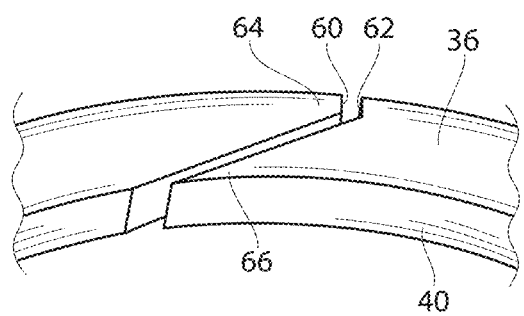
FIG. 31 is a perspective view of the embodiment shown in FIG. 30.

A variant of the JZ-cut is shown in FIGS. 30 and 31. In this alternate embodiment, a single radial cut 56 is located on outer peripheral surface 42, and cut 50 reaches diagonally through top and bottom faces 36, 38, terminating at inner peripheral surface 40. This yields abutments 60, 62 at the outer surface 42 but not at the inner surface 40. This variant is still an improvement over prior art cuts due to the fact that any sharp end portion 66 faces groove surface 28 and even if it does overlap during use, end 66 cannot extrude between piston 18 and interior surface 14 of cylinder 12.

Figure 1:
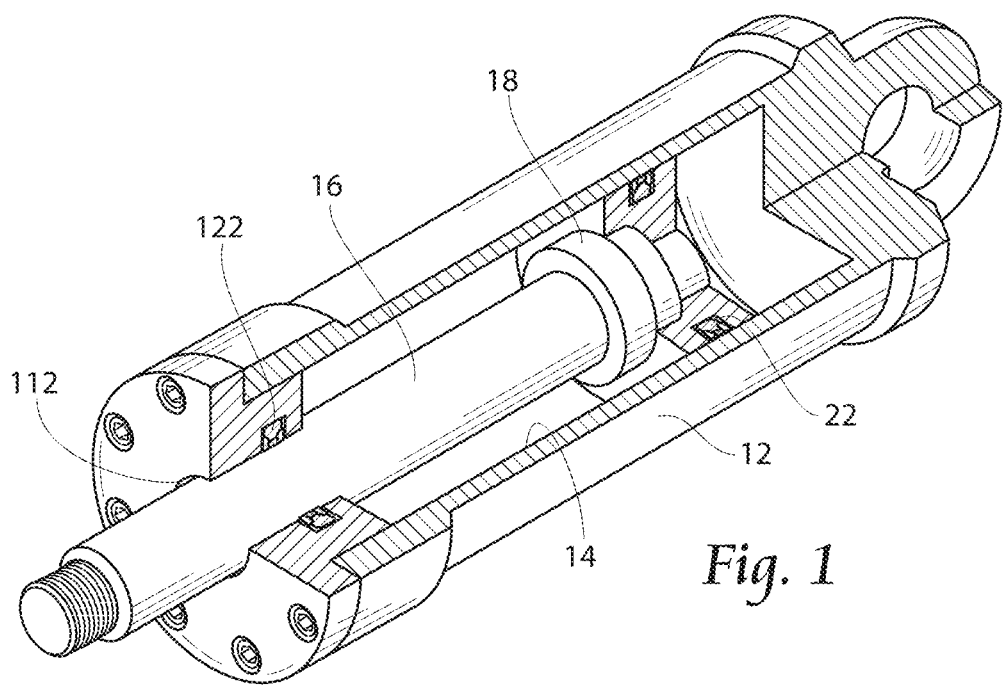
FIG. 1 is a cutaway perspective view of an exemplary hydraulic cylinder in which the present invention could be used.

It should be noted that the JZ-cut anti-extrusion ring 34 of the present invention, described above in relation to piston 18, can also be used effectively between rod 16 and rod cylinder 112. As shown in FIG. 1, a rod seal 122 is used in a reverse orientation of piston seal 22 to prevent extrusion downstream from piston system 10.

Test Results

Figure 32:
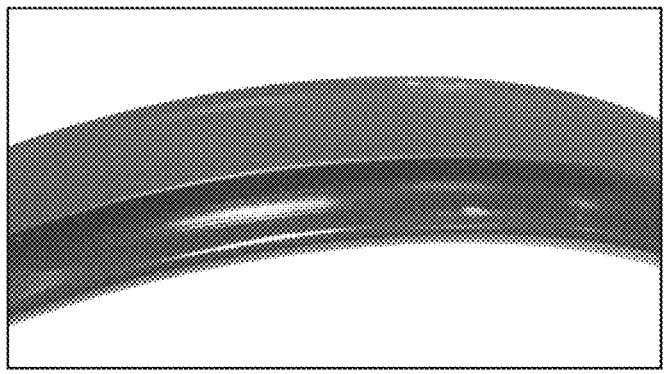
FIGS. 32-33 are photos of loader rings after use with a JZ-cut anti-extrusion ring.
Figure 33:
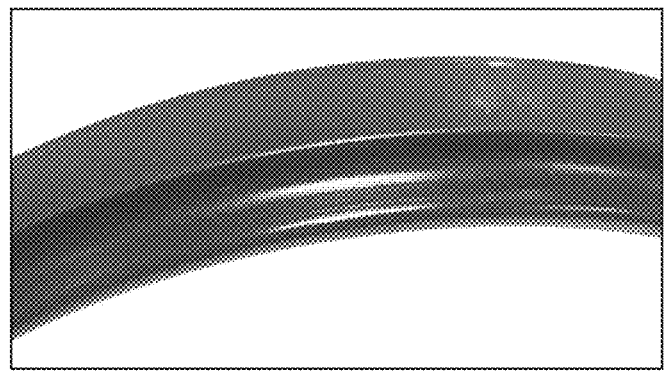
Figure 34:
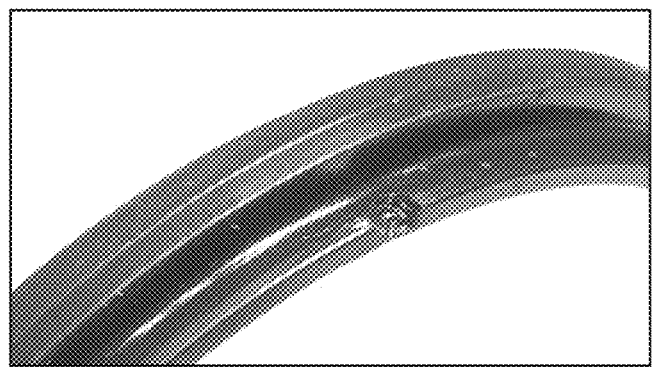
FIGS. 34-35 are photos of loader rings after use with a prior art anti-extrusion ring.
Figure 35:
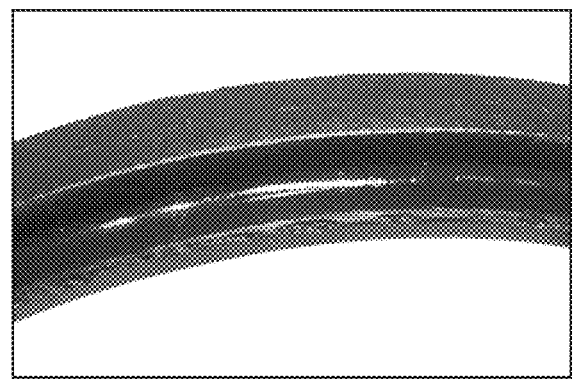

In testing, the JZ-cut anti-extrusion ring was compared to a competitor anti-extrusion ring of the same dimensions and having roughly the same material compositions on a T-shaped loader. The two rings were subjected to side-by-side dynamic impulse hydraulic testing consisting of 750,000 alternating pressure cycles at 5000 psi. After testing was complete, the condition of the T-shaped loaders used with the JZ-cut anti-extrusion ring and the scarf cut anti-extrusion ring was markedly different. As shown in FIGS. 32 and 33, the loader with the JZ-cut ring was virtually undamaged while the loader employing the competitor ring, shown in FIGS. 34 and 35, was damaged to the point of increasing the probability of seal failure.

Both of the loaders using the JZ-cut anti-extrusion ring were virtually undamaged, while use of prior art anti-extrusion rings allowed minor and major loader nibbling, both of which will ultimately lead to system contamination and possible loader failure.

As previously noted, the JZ-cut anti-extrusion ring allows for thermal expansion without overlap at cut end portions 52, 54. Likewise, under low temperature conditions, in which the anti-extrusion ring may contract, cut 50 allows for such contraction while still maintaining a seal. Further, the flexibility of the JZ-cut allows for tolerance variations, such as use of an oversized ring or an undersized cylinder bore, while still maintaining the integrity of seal assembly 22.

Methods of Manufacturing

In the past, anti-extrusion rings were created by turning tube stock using a lathe turned ring or injection molding a ring. A cut was then created using a second step such as milling or die stamping.

The manufacturing method of the present invention, however, is to injection mold the ring with the cut in place, thus saving a manufacturing step. While this method is used to create a JZ-cut which, as discussed above, significantly improves the life span of the seals on which they are used, the method could also be used to create other types of cut. Likewise, given the proper materials, the anti-extrusion rings could be 3D printed as a complete item including the cut.

It should be noted that, although the JZ-cut anti-extrusion ring of the present invention has been described in use with hydraulic systems, it is equally useful in many applications. These include, but are not limited to valves (such as control valves, gate valves, dump valves, and the like), pumps, accumulators, brake seals, hydraulic motor and swivel seals, shock absorber seals, and gas springs.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

I claim:

1. A substantially rigid anti-extrusion ring comprising a circumferential interior surface, a circumferential exterior surface, an annular top surface, and an annular bottom surface,
    wherein said at least one of said top and bottom surfaces is in direct contact with at least one of a top or bottom surface of a sealing member,
    wherein said interior surface has a first cut extending partially radially therethrough and wherein said exterior surface has a second cut extending partially radially therethrough,
    wherein said first and second cuts are offset from one another, and
    wherein a third cut extends through the top and bottom surfaces between the first and second cuts; and
    wherein said first and second cuts are between 0.01 and 0.25 inches and said cut is at least as long as said first or second cut.

2. The anti-extrusion ring of claim 1 wherein said first, second, and third cuts create a pair of corresponding discrete end portions, wherein said end portions are seated within a groove of a housing or piston in substantially mating connection with one another.

3. The anti-extrusion ring of claim 1 wherein said first and second cuts are oriented substantially 55° from the central axis of said anti-extrusion ring.

4. The anti-extrusion ring of claim 1 wherein said third cut is oriented between 40° and 120° from the orientation of said first and second cuts.

5. The anti-extrusion ring of claim 1 wherein said third cut is oriented between 70° and 80° from the orientation of said first and second cuts.

* * * * *